LEWIS MILLER.
Improvement in Recording-Dynamometers.
No. 127,088. Patented May 21, 1872.
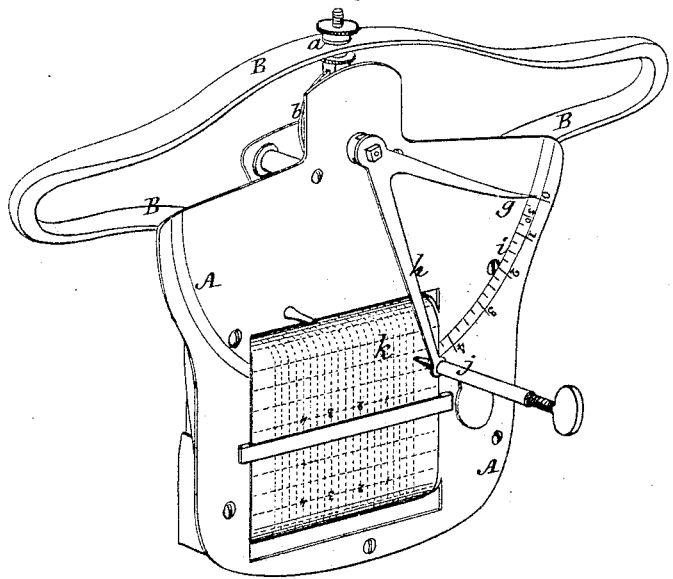
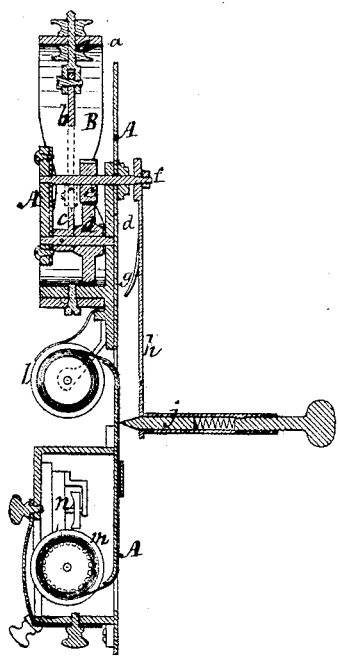
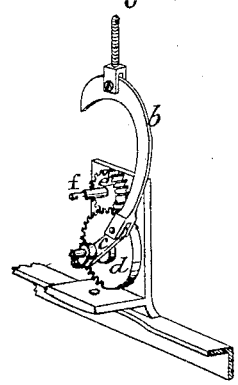
Witnesses.
Chas. C. Wilson
Edmund Masson.
Lewis Miller.
By atty A. B. Stoughton.

UNITED STATES PATENT OFFICE.

LEWIS MILLER, OF AKRON, OHIO.

IMPROVEMENT IN RECORDING-DYNAMOMETERS.

Specification forming part of Letters Patent No. 127,088, dated May 21, 1872.

*To all whom it may concern:*

Be it known that I, LEWIS MILLER, of Akron, in the county of Summit and State of Ohio, have invented certain new and useful Improvements in Portable Indicating and Registering Dynamometers; and I do hereby declare the following to be a full, clear, and exact description of the same, reference being had to the accompanying drawing making part of this specification, in which—

Figure 1 represents the dynamometer in perspective. Fig. 2 represents a section through the same. Fig. 3 represents, in perspective, a portion of the mechanism not distinctly seen in the other figures.

Similar letters of reference, where they occur in the separate figures, denote like parts in the drawing.

I am aware that an indicating-dynamometer alone has heretofore been made and used substantially like that herein shown and described. To this I lay no claim, as it makes no record of the draught, and, as the indicator is constantly vibrating over the scale, an approximate idea of the draft is only observable to the vision, and no correct data given or preserved.

My invention consists in combining, with a portable dynamometer having a vibrating indicating-arm, a recording or registering mechanism, by which the exact or average draft or strain upon it may be ascertained at all times, and a record of it marked down and kept.

To enable others skilled in the art to make and use my invention, I will proceed to describe the same with reference to the drawing.

A represents a case or frame, to which is attached an elliptic spring, B, one bar of said spring being fastened to the case or frame A and the other bar free to yield to any and all strains, except to work the indicating mechanism. To the free bar of the spring, as at $a$, is adjustably connected an arm, $b$, the lower end of which is pivoted to an arm or crank, $c$, fastened to the shaft of a gear-wheel, $d$; and this gear-wheel $d$ works in and turns a pinion, $e$, on the shaft or journal $f$ of which pinion the indicating and registering fingers $g\ h$ are placed and by which they are moved. The fingers $g$ and $h$, though performing different duties, move together, and may be made of one piece of metal. The indicating finger or pointer $g$ moves over the scale $i$ so as to show the average amount of strain or draft upon the instrument when in use. The registering-arm $h$ carries a pencil or other marking-instrument holder, $j$, which marking instrument traverses over and in contact with a strip of marked or lined paper, $k$, which is automatically fed along, and receives and retains in profile the variable draft or force required to move a machine over the ground—as, for instance, a harvesting-machine, plow, seeder, or any other machine drawn upon and over the ground, where the draft or power is constantly varying, and cannot be correctly computed by an indicator alone, which is in constant motion and indicates no general average. The paper $k$, upon which the record is kept, is fed along from one roller, $l$, whereon it is wound, to another roller, $m$, which latter roller $m$ is turned by a simple clock-gear, $n$, worked by the uncoiling or expanding of a coiled spring in the ordinary well-known way.

The appliances for preventing the paper-containing roll from too freely moving, for winding up the paper-moving gear, for stopping the driving gear when the machine is not moving, for adjusting the paper, placing, and removing of it, are all well known and need not be particularly described.

The paper is ruled longitudinally and transversely. The transverse lines, at points, may be marked by figures 1, 2, 3, 4, &c., indicating, for instance, one, two, three, and four hundred pounds, the intermediate lines indicating fractions of such weights or forces. The traverse of the marks on each side of such general lines shows the extremes of the draft or strain on the dynamometer, from which the average may be readily ascertained, the lines serving as indicators to compute from or by.

What I claim is—

In combination, in a dynamometer with a fixed scale, $i$, and an automatically-moved graduated paper, $k$, a forked arm, vibrated by the expansion and contraction of a spring, one limb, $g$, of which arm indicates upon the scale the force exerted on the spring, and the other limb, $h$, of which records that force on the paper, substantially as and for the purpose described.

L. MILLER.

Witnesses:
A. B. STOUGHTON,
EDMUND MASSON.